United States Patent

Birchenough

[15] 3,638,103

[45] Jan. 25, 1972

[54] SWITCHING REGULATOR

[72] Inventor: Arthur G. Birchenough, Brookpark, Ohio

[73] Assignee: The United States of America as represented by the Administrator of the National Aeronautics and Space Administration

[22] Filed: Nov. 3, 1970

[21] Appl. No.: 86,548

[52] U.S. Cl. .......................... 323/22 T, 323/38, 323/DIG. 1
[51] Int. Cl. ............................................................. G05f 1/56
[58] Field of Search ........................... 323/22 T, 38, DIG. 1

[56] References Cited

UNITED STATES PATENTS

| | | | |
|---|---|---|---|
| 3,204,174 | 8/1965 | Clerc | 323/22 T |
| 3,461,377 | 8/1969 | Reese | 323/22 T |
| 3,173,074 | 3/1965 | Domann | 323/22 T |
| 3,229,194 | 1/1966 | Mills | 323/22 T |

Primary Examiner—A. D. Pellinen
Attorney—N. T. Musial, J. A. Mackin and John R. Manning

[57] ABSTRACT

A switch connected between an unregulated DC power source and a load is controlled by a variable conductance device which compares the load voltage to a reference voltage. If the load voltage tends to increase above a predetermined value the variable conductance device tends to reduce the conduction of the switch. A hysteresis network provides feedback to the variable conductance device to produce a cumulative action so that the switch will turn off rapidly when the variable conductance device tends to reduce the conduction of the switch, and similarly, will turn on rapidly when the variable conductance device increases the conduction of the switch.

11 Claims, 1 Drawing Figure

3,638,103

INVENTOR
ARTHUR G. BIRCHENOUGH

BY Norman T. Musial
James A. Mackin

ATTORNEYS

SWITCHING REGULATOR

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

The invention is in the field of voltage regulators and is directed more particularly to a voltage regulator of the switching type.

Voltage regulators of the switching type basically comprise a switch device connected between a DC source and a load. The voltage of the source is greater than the voltage of the load and to obtain a predetermined voltage on the load the switch is repetitively opened at a desired frequency. Accordingly, the voltage appearing across the load is a series of pulses whose width may be increased or decreased by appropriately varying the length of time during which the switch is opened. Thus, the average voltage applied to the load will increase as pulse width increases and decrease as pulse width decreases. To provide a relatively smooth DC voltage for the load an LC-type filter circuit is usually connected between the switch and the load.

In prior art circuits, the switch has been controlled by circuits such as Schmitt triggers and multivibrators which in turn are controlled from voltage comparator circuits. Such circuits are complex and relatively expensive because of the number of components required.

OBJECTS AND SUMMARY OF THE INVENTION

It is an object of the invention to provide a voltage regulator of the switching type requiring a minimum of circuit components.

It is another object of the invention to provide a switching type voltage regulator which includes no multivibrators or Schmitt triggers.

Still another object of the invention is to provide a switching regulator having a relatively simple circuit arrangement.

In summary, the invention provides a switching regulator having relatively simple, inexpensive circuitry, yet which operates at high efficiency.

DESCRIPTION OF THE PREFERRED EMBODIMENT

Figure 1:
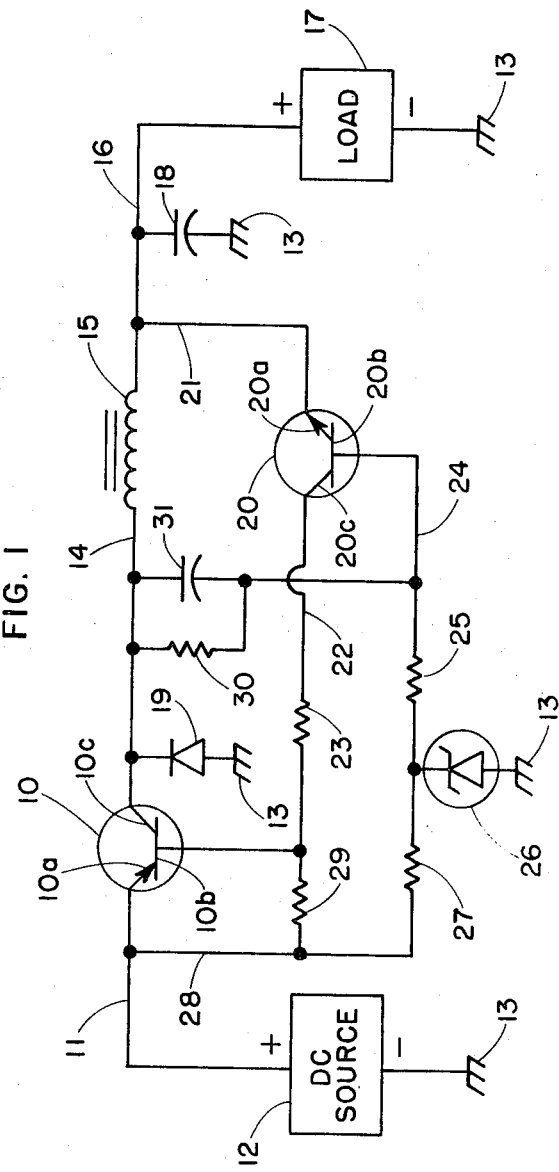
FIG. 1 is a circuit diagram of a switching regulator embodying the invention.

Referring to the single figure it will be seen that the circuitry embodying the invention may include a switch such as PNP-type transistor 10 which has an emitter electrode 10a connected through a lead 11 to one side of an unregulated DC source 12 the other side of which is connected to a common ground 13. A collector electrode 10c of transistor 10 is connected via a lead 14, an inductor 15 and a lead 16 to one side of a load 17. The other side of the load 17 is connected to the common ground 13. A filter capacitor 18 connected between the lead 16 and the common ground 13 together with the inductor 15 forms a filter circuit to ensure that the DC voltage supplied to the load 17 is substantially ripple free. A diode 19 is connected between the lead 14 and common ground 13, as shown, so that current may flow from ground 13 through the diode 19, lead 14 and the inductor 15 to the load each time transistor 10 turns off. This diode is preferably of the fast recovery type because the transistor 10 switches from off to on and vice versa in a matter of a few microseconds.

To the end that the conduction of transistor 10 will be appropriately controlled to regulate the voltage supplied to the load 17, there is provided an NPN-type transistor 20 having an emitter electrode 20a, a base electrode 20b and a collector electrode 20c and which serves as a variable conducting device having power electrodes and a control electrode. The emitter electrode 20a of transistor 20 is connected through a lead 21 to a lead 16 while the collector electrode 20c is connected via a lead 22 and a resistor 23 to a base electrode 10b of transistor 10.

In order that the transistor 20 may be rendered nonconducting when the voltage supplied to the load 17 exceeds a predetermined magnitude, the base electrode 20b is connected through a lead 24, a resistor 25 and a zener diode 26 to the common ground 13. Current is supplied to the zener diode 26 through a resistor 27 connected from a point between resistor 25 and the zener diode 26 to the lead 11 by means of a lead 28. The zener diode 26 serves as a fixed voltage reference source in that the constant voltage appearing thereacross is applied through resistor 25 and lead 24 to the base electrode 20b of transistor 20.

A resistor 29 is connected between the lead 28 and the base electrode 10b of transistor 10. The resistor 29 establishes an additional path for current to flow from a DC source to the collector electrode 20c of transistor 20 together with the current which flows toward that collector from the emitter-base circuit path of the transistor 10. Resistor 29 assists in the turn off of transistor 10 by diverting leakage current from the base-emitter circuit of transistor 10.

Figure 2:
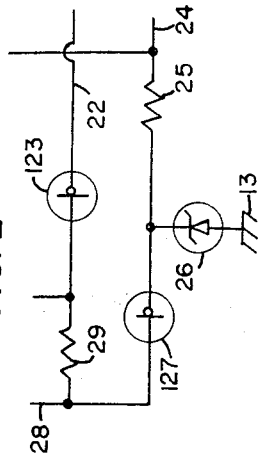
FIG. 2 is a schematic of an alternate embodiment of a portion of FIG. 1.

The efficiency of the switching regulator circuit embodying the invention may be increased somewhat by substituting constant current diodes (CCD) 123 and 127 as shown in FIG. 2 for the resistors 23 and/or 27 of FIG. 1 in which parts corresponding to those of FIG. 2 bear like numerals.

To the end that the transistor 20 will switch fully off when its current begins to decrease and will switch fully on when its current begins to increase there is provided a hysteresis producing circuit network comprising a resistor 30 connected between leads 14 and 24 with a capacitor 31 connected in parallel to the resistor 30. The resistor 30 and resistor 25 from a voltage divider network in which the resistor 30 provides a positive feedback to the transistor 20 to produce a cumulative effect as will be explained presently. Capacitor 31 aids the cumulative action.

Operation of the foregoing circuitry for one cycle of operation, that is one interruption of the voltage being supplied from the DC source 12 to the load 17, will now be described with the condition that the voltage of the DC source 12 is greater than the desired predetermined voltage to be applied to the load 17. Assume that at a first instant of time transistors 10 and 20 are conducting. If now the voltage applied to the load 17 as measured between the lead 16 and the common ground 13 increases slightly, the conduction of the transistor 20 will begin to decrease. This results because the emitter electrode 20a of transistor 20 becomes more positive with respect to the base electrode 20b when the voltage on lead 16 increases.

The decreasing conduction of transistor 20 reduces the current which it draws from the DC source 12 through lead 11, the emitter-base path of transistor 10, resistor 23 and lead 22. The reduced emitter-base current flow through the transistor 10 causes it to likewise decrease in conduction. As a result, the voltage on the lead 14 decreases producing a negative-going signal which is applied through resistor 30 to the base electrode 20b of transistor 20. This negative-going signal further decreases the conduction of transistor 20 which in turn reduces the conduction of transistor 10 thereby increasing the magnitude of the negative-going signal being applied to the base electrode 20b of transistor 20. This action is cumulative and as a result the transistor 20 goes from full conduction to zero conduction substantially instantaneously.

Transistors 20 and 10 will remain nonconducting until the voltage on the lead 16 drops slightly below the prescribed value. This produces a negative-going voltage on the emitter electrode 20a of transistor 20 as compared to the fixed voltage applied to the base electrode 20b by the zener diode 26 and the voltage divider formed by resistors 30 and 25. Consequently, transistor 20 begins to conduct. This causes current to flow from the DC source 12 through the lead 11, the emitter-base path of transistor 10, resistor 23, lead 22, the collector-emitter path of transistor 20, lead 21 and lead 16 to the load 17.

The current flow through the emitter-base path of transistor 10 causes that transistor to begin conducting to supply voltage from the DC source 12 to the lead 14 at the input size of the inductor 15. This positive-going voltage is applied to the base electrode 20b of transistor 20 through the resistor 30 and causes a cumulative action as previously described for the turnoff of transistor 20. Because of the cumulative action, transistors 20 and 10 go substantially instantaneously from nonconducting to fully conducting states.

The switching action in which transistor 10 alternates between fully on and fully off states takes place at approximately 1,000 cycles per second in the above-described circuit. However, it will be clear to those skilled in the art that higher or lower frequencies may be used by adjusting the size of the components and, particularly, by providing high-speed transistors and diodes when high-frequency switching rates are desired.

The ratio of off-time to on-time of transistor 10 is controlled by the transistor 20 in accordance with variations of load voltage above and below a prescribed value. As a result, there is delivered to the inductor 15 for filtering, a train of pulses whose width is varied in a manner so as to provide to the load 17 a DC voltage of a prescribed value with minimum ripple. This is accomplished at high efficiency with a relatively simple circuit having a minimum of expensive components.

It will be understood by those skilled in the art that changes and modifications may be made to the above-described switching regulator circuit without departing from the spirit and scope of the invention as set forth in the claims appended hereto.

What is claimed is:

1. A switching voltage regulator adapted to be connected between one side of a DC source and one side of a load, the other side of the DC source and load being grounded, said regulator comprising, in combination, a first switch having first and second power electrodes and a control electrode;

means for connecting said first power electrode of said switch to one side of the DC source;

filter circuit means connected between said second power electrode of said switch and said one side of the load;

variable conducting means having first and second signal output electrodes and a signal input electrode, said first signal output electrode being connected to said one side of the load and said second signal output electrode being connected to said control electrode of said switch to control the conduction of said switch;

a constant voltage DC source;

means for connecting said constant voltage source to said signal input electrode of said variable conducting means; and means responsive to said first switch for turning said variable conducting means fully off when conduction of said first switch decreases and fully on when conduction of said first switch increases.

2. The circuit of claim 1 wherein said switch is a transistor.

3. The circuit of claim 2 and further including a resistor connected between said one side of said DC source and said control electrode of said switch.

4. The circuit of claim 1 wherein said variable conducting means is a transistor and wherein said means for connecting said second signal electrode to said control electrode of said switch is a voltage dropping element.

5. The circuit of claim 4 wherein said voltage dropping element is a resistor.

6. The circuit of claim 4 wherein said voltage dropping element is a constant current diode.

7. The circuit of claim 4 wherein said constant voltage source is a zener diode and further including a resistor connected between said one side of said DC source and said zener diode to provide current thereto.

8. The circuit of claim 7 wherein said responsive means comprises a second voltage dropping element connected between said second power electrode of said switch and the base electrode of said transistor and wherein said means for connecting said constant voltage source to said signal input electrode of said variable conducting means is a third voltage dropping element.

9. The circuit of claim 8 wherein said second and third voltage dropping elements are resistors.

10. The circuit of claim 9 and further including a capacitor connected in parallel with said resistor comprising said second voltage dropping means.

11. The circuit of claim 10 wherein said filter means includes an inductive reactor in series with the load current path and further including in said circuit a diode connected between said second power electrode of said switch and ground to provide a path for the inductive reactor current when said switch is open.

* * * * *